(12) United States Patent
Aoki (10) Patent No.: US 9,999,871 B2
(45) Date of Patent: Jun. 19, 2018

(54) CATALYTIC CONVERTER

(71) Applicant: TOYOTA JIDOSHA KABUSHIKI KAISHA, Toyota-shi, Aichi-ken (JP)

(72) Inventor: Yuki Aoki, Nisshin (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days. days.

(21) Appl. No.: 15/027,913

(22) PCT Filed: Oct. 6, 2014

(86) PCT No.: PCT/IB2014/002035
§ 371 (c)(1),
(2) Date: Apr. 7, 2016

(87) PCT Pub. No.: WO2015/052569
PCT Pub. Date: Apr. 16, 2015

(65) Prior Publication Data
US 2016/0256854 A1    Sep. 8, 2016

(30) Foreign Application Priority Data

Oct. 9, 2013   (JP) ................................. 2013-211785

(51) Int. Cl.
*B01J 23/10*    (2006.01)
*B01J 23/00*    (2006.01)
(Continued)

(52) U.S. Cl.
CPC .......... *B01J 23/464* (2013.01); *B01D 53/945* (2013.01); *B01J 23/10* (2013.01); *B01J 23/44* (2013.01);
(Continued)

(58) Field of Classification Search
CPC .... B01J 23/10; B01J 35/0006; B01J 37/0018; B01J 35/04; B01J 37/0244; B01J 23/63;
(Continued)

(56) References Cited

U.S. PATENT DOCUMENTS

2001/0006934 A1* 7/2001 Kachi .................. B01D 53/945
502/325
2006/0270550 A1* 11/2006 Shimizu ............... B01D 53/945
502/325
(Continued)

FOREIGN PATENT DOCUMENTS

JP    2008-023451 A    2/2008
JP    2010-029752 A    2/2010
(Continued)

*Primary Examiner* — Haytham Soliman
(74) *Attorney, Agent, or Firm* — Sughrue Mion, PLLC (57) ABSTRACT

A catalytic converter includes a substrate (1) and a catalyst layer (3). The catalyst layer includes a bottom catalyst layer (4), a first top catalyst layer (6) and a second top catalyst layer (7). The second top catalyst layer is provided on a downstream side relative to the first top catalyst layer. The first top catalyst layer is made of a ceria-free zirconia composite oxide support and rhodium. The second top catalyst layer is made of a ceria-containing zirconia composite oxide support and rhodium. The first top catalyst layer has a length that is X % of the entire length of the substrate. The second top catalyst layer has a length that is 100−X % of the entire length of the substrate. A ratio of a density of rhodium in the first top catalyst layer to a density of rhodium in the second top catalyst layer is at least 1 and at most 3.

7 Claims, 4 Drawing Sheets

(51) Int. Cl.
  *B01J 23/46* (2006.01)
  *B01J 35/00* (2006.01)
  *B01J 23/63* (2006.01)
  *B01D 53/94* (2006.01)
  *B01J 37/02* (2006.01)
  *B01J 23/44* (2006.01)
  *B01J 35/04* (2006.01)
  *F01N 3/10* (2006.01)

(52) U.S. Cl.
  CPC ............ *B01J 23/63* (2013.01); *B01J 35/0006* (2013.01); *B01J 35/04* (2013.01); *B01J 37/0244* (2013.01); *B01J 37/0248* (2013.01); *B01D 2255/1023* (2013.01); *B01D 2255/1025* (2013.01); *B01D 2255/2065* (2013.01); *B01D 2255/20715* (2013.01); *B01D 2255/40* (2013.01); *B01D 2255/407* (2013.01); *B01D 2255/908* (2013.01); *B01D 2255/9022* (2013.01); *B01D 2255/9032* (2013.01); *B01D 2255/9155* (2013.01); *B01D 2258/014* (2013.01); *B01J 2523/00* (2013.01); *F01N 3/101* (2013.01); *F01N 2510/0684* (2013.01); *Y02T 10/22* (2013.01)

(58) Field of Classification Search
  CPC .. B01J 23/002; B01J 37/0248; B01J 2523/00; B01D 53/945; Y02T 10/22; Y02C 20/10
  USPC .......................................................... 502/303
  See application file for complete search history.

(56) References Cited

U.S. PATENT DOCUMENTS

| | | |
|---|---|---|
| 2009/0041643 A1 | 2/2009 | Deeba et al. |
| 2009/0197764 A1 | 8/2009 | Yamato et al. |
| 2011/0041486 A1 | 2/2011 | Kato et al. |
| 2012/0283091 A1 | 11/2012 | Sunada et al. |
| 2013/0310248 A1 | 11/2013 | Aoki |
| 2014/0228209 A1 | 8/2014 | Aoki |

FOREIGN PATENT DOCUMENTS

| | | | |
|---|---|---|---|
| JP | 2012-020276 A | 2/2012 | |
| JP | 2012-040547 A | 3/2012 | |
| JP | 2012-152702 A | 8/2012 | |
| JP | 2013-091041 A | 5/2013 | |
| WO | WO 2011081219 A2 * | 7/2011 | ........... B01D 53/945 |
| WO | 2013/182303 A1 | 12/2013 | |
| WO | 2015/025200 A1 | 2/2015 | |

* cited by examiner

CATALYTIC CONVERTER

BACKGROUND OF THE INVENTION

1. Field of the Invention

The invention relates to a catalytic converter that is housed within a pipe making up an exhaust gas emission system and is secured to the pipe.

2. Description of Related Art

A variety of efforts aimed at reducing environmental impacts and burden are being carried out on a global scale in many industrial fields. In the automotive industry, developments are constantly being made to expand the use and further enhance the performance of not only high fuel-performance gasoline engine vehicles, but also "eco cars" such as hybrid vehicles and electric cars. In addition to the development of such eco cars, active research is also being conducted on exhaust gas purifying catalysts which purify the exhaust gases emitted by engines. Such exhaust gas purifying catalysts include oxidation catalysts, three-way catalysts and nitrogen oxide (NOx) storage/reduction catalysts. In such exhaust gas purifying catalysts, the catalytic activity is exhibited by noble metal catalysts such as platinum (Pt), palladium (Pd) and rhodium (Rh). The noble metal catalysts are typically used in a state where the noble metal catalysts are supported on a support made of a porous oxide such as alumina ($Al_2O_3$).

Catalytic converters for purifying exhaust gases are generally installed in an exhaust system connecting a vehicle engine and a muffler. The engine may emit harmful substances to the environment, such as carbon monoxide (CO) and NOx, unburned hydrocarbons (HCs) and volatile organic compounds (VOCs). The catalytic converter is constructed so as to convert such harmful substances into acceptable substances. In a catalytic converter, a catalyst layer in which a noble metal catalyst including such as Rh, Pd, and Pt is supported on a support is disposed on a cell wall surface of a substrate. When exhaust gases are passed through the catalytic converter, CO is converted to $CO_2$, NOx is converted to $N_2$ and $O_2$, and VOCs are burned, forming $CO_2$ and $H_2O$.

The support on which a noble metal catalyst is supported is exemplified by $CeO_2$—$ZrO_2$ solid solutions (commonly referred to as CZ materials or cerium oxide (ceria)-zirconia composite oxides). This is also called a promoter and is a constituent essential to the above-mentioned three-way catalyst which simultaneously removes the harmful substances CO, NOx and HCs in exhaust gases. $CeO_2$ is one constituent essential to the promoter. $CeO_2$, owing to the fact that the oxidation number changes between $Ce^{3+}$ and $Ce^{4+}$ depending on the partial pressure of oxygen within the exhaust gases to which $CeO_2$ is exposed, has the function of absorbing and releasing oxygen to compensate for a surplus or deficiency of charge and has an oxygen storing function (which functions are collectively referred here as the oxygen storage capacity (OSC). Moreover, to ensure a conversion window for this three-way catalyst, the $CeO_2$ absorbs and eases atmospheric fluctuations in the exhaust gases, enabling a close-to-stoichiometric air-fuel ratio to be maintained.

In catalytic converters, it is important how to lower the amount of noble metal catalysts used in such three-way catalysts in terms of reducing the "material risk" of, for example, rare metals and ensuring cost competitiveness. However, greatly decreasing the amount of noble metal catalysts in three-way catalysts also greatly lowers the catalytic activity, resulting in marked declines in, for example, the OSC, the low-temperature activity, and also the NOx conversion performance in a high-temperature environment. This is because a large decrease in the amount of noble metal catalysts greatly lowers the number of active sites, and the greatly lowered number of catalyst reaction sites leads to a pronounced decline in the conversion performance.

Of the noble metal catalysts Pt, Pd and Rh particularly used in three-way catalysts, Rh has the best NOx conversion performance. On the other hand, Rh has the highest market price per unit weight. Conventionally, a high OSC can be achieved by supporting Rh on a cerium oxide (ceria)-containing support. However, there is also a trade-off in that increasing the amount of cerium oxide in the support has the undesired effect of lowering the NOx conversion performance distinctive to Rh. Therefore, when Rh is used as a noble metal catalyst in a three-way catalyst, design guidelines are needed for creating three-way catalysts that optimize both the OSC and the NOx conversion performance.

Concerning the production of optimal three-way catalysts, in light of the differences in, performance between diverse noble metal catalysts and carriers depending on the constituents therein, intensive research is being conducted on zone-coated catalysts in which different constituents are arranged on the upstream and downstream sides of the substrate so as to be able to effectively elicit the characteristics of each constituent.

One such zone-coated catalyst is described in Japanese Patent Application Publication No. 2012-040547 (JP 2012-040547 A), which discloses an exhaust gas purifying catalyst including a substrate that forms gas flow channels for the flow of exhaust gases, and a catalyst layer formed on the substrate. More specifically, the catalyst layer employed here is made of a bottom catalyst layer, a first-stage top catalyst layer and a second-stage top catalyst layer. The bottom catalyst layer is formed on a surface of the substrate. The first-stage top catalyst layer covers a surface of the bottom catalyst layer on an upstream side in a gas flow direction. The second-stage top catalyst layer covers a surface of the bottom catalyst layer on a downstream side in the gas flow direction from the first-stage top catalyst layer. The bottom catalyst layer supports at least one of Pd and Pt, the second-stage top catalyst layer supports Rh, and the first-stage top catalyst layer supports Pd. The support which supports the Pd of the first-stage top catalyst layer is a $Y_2O_3$-containing $ZrO_2$ composite oxide. It is described that, with this arrangement, the purifying properties of the catalytic noble metals can be fully exhibited, enabling the low-temperature conversion performance of the catalyst to be increased. It is also described that, by using a $Y_2O_3$-doped $ZrO_2$ composite material having a low specific heat and excellent heat resistance as the support material in the first-stage top catalyst layer, the catalyst temperature rise properties are enhanced while also ensuring the heat resistance, thus enabling a durable catalyst warm-up performance to be obtained.

Japanese Patent Application Publication No. 2012-152702 (JP 2012-152702 A) discloses an exhaust, gas purifying catalyst having a substrate, a bottom catalyst layer which is formed on the substrate and includes at least one of Pd and Pt, and a top catalyst layer which is formed on the bottom catalyst layer and includes Rh. A region that does not include the top catalyst layer is provided on an exhaust gas upstream side of the exhaust gas purifying catalyst. The bottom catalyst layer is made of a first-stage bottom catalyst layer on an exhaust gas upstream side and a second-stage bottom catalyst layer on an exhaust gas downstream side. The first-stage bottom catalyst layer includes an oxygen storage material. It is described that this arrangement makes it possible to markedly suppress grain growth by the various catalyst metals supported in the respective catalyst layers, particularly the second-stage bottom catalyst layer on the exhaust gas downstream side and the top catalyst layer. Moreover, it is described that, by providing, on the exhaust gas upstream side, a region that does not include the top catalyst layer, the diffusibility of HCs to the interior of the first-stage bottom catalyst layer can be increased, thus promoting the conversion of HCs in the first-stage bottom catalyst layer and making it possible to achieve a satisfactory catalyst warm-up performance.

In addition, Japanese Patent Application Publication No. 2012-020276 (JP 2012-020276 A) discloses an exhaust gas purifying catalyst in which the catalyst layers making up the catalyst include a bottom catalyst layer, a first-stage top catalyst layer and a second-stage top catalyst layer. The bottom catalyst layer is formed on the surface of a substrate. The first-stage top catalyst layer covers the surface of the bottom catalyst layer on an upstream side in a gas flow direction. The second-stage top catalyst layer covers the surface of the bottom catalyst layer on a downstream side in the gas flow direction from the first-stage top catalyst layer. Here, the bottom catalyst layer supports at least one of Pd and Pt, the first-stage top catalyst layer supports Pd, and the second-stage top catalyst layer supports Rh. The first-stage top catalyst layer has a density of supported Pd of from 4.5 to 12 wt %. It is described that this arrangement enables the purifying properties of the noble metal catalyst to be fully exhibited, increasing the low-temperature conversion performance of the catalyst.

As described above, there exists a variety of art relating to zone-coated catalysts.

SUMMARY OF THE INVENTION

Accordingly, the invention provides a catalytic converter having an excellent OSC, an excellent NOx conversion performance under high engine load, and an excellent catalyst warm-up performance.

The catalytic converter according to one aspect of the invention includes a substrate and a catalyst layer. The substrate includes a cell structure configured to allow exhaust gas to flow through the cell structure. The catalyst layer is formed on a surface of a cell wall of the substrate. The catalyst layer includes a bottom catalyst layer, a first top catalyst layer and a second top catalyst layer. The bottom catalyst layer is provided on a surface of the substrate over an entire length of the substrate. The first top catalyst layer is provided on a surface of the bottom catalyst layer on an upstream side of the substrate in an exhaust gas flow direction. The second top catalyst layer is provided on a surface of the bottom catalyst layer on a downstream side of the substrate in the exhaust gas flow direction. The bottom catalyst layer is made of a support and Pd supported on the support. The first top catalyst layer is made of a ceria-free zirconia composite oxide support and Rh supported on the ceria-free zirconia composite oxide support. The second top catalyst layer is made of a ceria-containing zirconia composite oxide support and Rh supported on the ceria-containing zirconia composite oxide support. The first top catalyst layer starts from an upstream side end of the substrate and has a length that is X % of the entire length of the substrate, X being from 30 to 70. The second top catalyst layer starts from a downstream side end of the substrate and has a length that is 100–X % of the entire length of the substrate in the exhaust gas flow direction. A ratio of a density of Rh supported in the first top catalyst layer to a density of Rh supported in the second top catalyst layer is at least 1 and at most 3.

In the catalytic converter according to this aspect of the invention, a zone-coated catalyst is employed as the catalyst layer formed on the cell wall of the substrate having the cell structure. The bottom catalyst layer is provided on the surface of the substrate along the entire length of the substrate. The top catalyst layer is stacked on the surface of the bottom catalyst layer. Thus, the catalytic converter according to this aspect of the invention has catalyst layers constituting a two-layer structure. The first top catalyst layer is provided on the upstream side (Fr side) of the substrate in the exhaust gas flow direction, and the second top catalyst layer is provided on the downstream side (Rr side) of the substrate. That is, the zone-coated catalyst layer is employed as the top catalyst layer in catalyst layers constituting the two-layer structure. The first top catalyst layer has the support made of the ceria-free zirconia composite oxide, and the second top catalyst layer has the support made of the ceria-containing zirconia composite oxide. The first top catalyst layer and the second top catalyst layer both support Rh. The first top catalyst layer is formed over the range that is X % of the entire length of the substrate, where X is from 30 to 70. In addition, the ratio SD1/SD2 of the density of supported Rh (SD1) in the first top catalyst layer to the density of supported Rh (SD2) in the second top catalyst layer is at least 1 and at most 3. This arrangement provides a catalytic converter which has an excellent OSC, an excellent NOx conversion performance under high engine load, and also an excellent catalyst warm-up performance.

In the catalytic converter according to this aspect of the invention, the first top catalyst layer and the second top catalyst layer respectively include Rh as the noble metal catalyst. Furthermore, the first top catalyst layer that includes the ceria-free support is formed over the range that is X % of the entire length of the substrate, with X being from 30 to 70, and the second top catalyst layer that includes the ceria-containing support accounts for the remaining length of the substrate. Thus, the catalytic converter sufficiently exhibits both OSC and NOx conversion performance although OSC and NOx conversion performance are contrary each other.

Moreover, because the ratio SD1/SD2 of the density of supported Rh (SD1) in the first top catalyst layer to the density of supported Rh (SD2) in the second top catalyst layer is adjusted to at least 1 and at most 3, the catalytic converter sufficiently exhibits NOx conversion performance during high engine load and the catalyst warm-up performance.

Here, the substrate having a cell structure may be formed of a ceramic material such as cordierite (made of a composite oxide of magnesium oxide, aluminum oxide and silicon dioxide) or silicon carbide. Alternatively, the substrate having a cell structure may be formed of a material other than a ceramic material, such as a metallic material. The substrate may have a so-called honeycomb structure having numerous lattices, e.g., tetragonal, hexagonal or octagonal cells.

The bottom catalyst layer that is formed on the cell wall surfaces in the substrate may include, as the support, an oxide made of any one of ceria ($CeO_2$), zirconia ($ZrO_2$) and alumina ($Al_2O_3$), or a composite oxide of two or more of these. For example, the composite oxide may be the $CeO_2$—$ZrO_2$ compounds referred to as "CZ materials", or $Al_2O_3$—$CeO_2$—$ZrO_2$ tertiary composite oxides ("ACZ materials") into which $Al_2O_3$ is introduced as a diffusion barrier.

A $CeO_2$—$ZrO_2$ compound (CZ material), an $Al_2O_3$—$CeO_2$—$ZrO_2$ tertiary composite oxide (ACZ material) or the like may be used as the support employed in the second top catalyst layer on the downstream side of the substrate, the CZ material and ACZ material being zirconia composite oxides which include at least ceria ($CeO_2$). ACZ materials contains $Al_2O_3$ as a diffusion barrier. An $Al_2O_3$—$ZrO_2$ binary composite oxide (AZ material) or the like may be used as the support employed in the first top catalyst layer on the upstream side of the substrate. Here, "AZ material" refers to a zirconia composite oxide which does not contain ceria ($CeO_2$).

The catalytic converter according to this aspect of the invention may preferably have a cordierite honeycomb support with an excellent thermal shock resistance. Alternatively, the catalytic converter of this aspect of the invention may be an electrically heated catalytic converter (available as an electrically heated converter (EHC)). The electrically heated catalytic converter is constructed so as to heat the honeycomb catalyst by, for example, attaching a pair of electrodes to a honeycomb catalyst and passing electricity through the electrodes. The activity of the honeycomb catalyst is increased in this way, thereby rendering harmless the exhaust gas passing through the catalytic converter. By employing an electrically heated catalytic converter in the exhaust system that connects the vehicle engine and the muffler, in addition to purifying exhaust gases at ordinary temperatures, exhaust gases can be purified even at cold temperatures because the catalyst is activated by electrical heating.

As can be appreciated from the above explanation, the catalytic converter provided according to this aspect of the invention has an excellent OSC, an excellent NOx conversion performance during high engine load, and also has an excellent catalyst warm-up performance.

BRIEF DESCRIPTION OF THE DRAWINGS

Features, advantages, and the technical and industrial significance of exemplary embodiments of the invention will be described below with reference to the accompanying drawings, in which like numerals denote like elements, and wherein.

DETAILED DESCRIPTION OF EMBODIMENTS

Figure 1A:
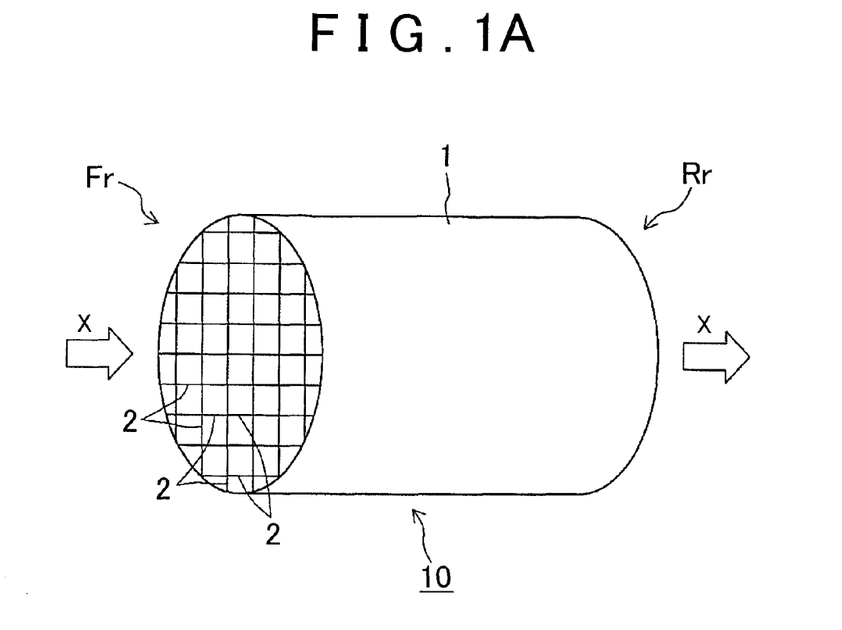
FIG. 1A is a schematic view of a catalytic converter according to an embodiment of the invention.
Figure 1B:
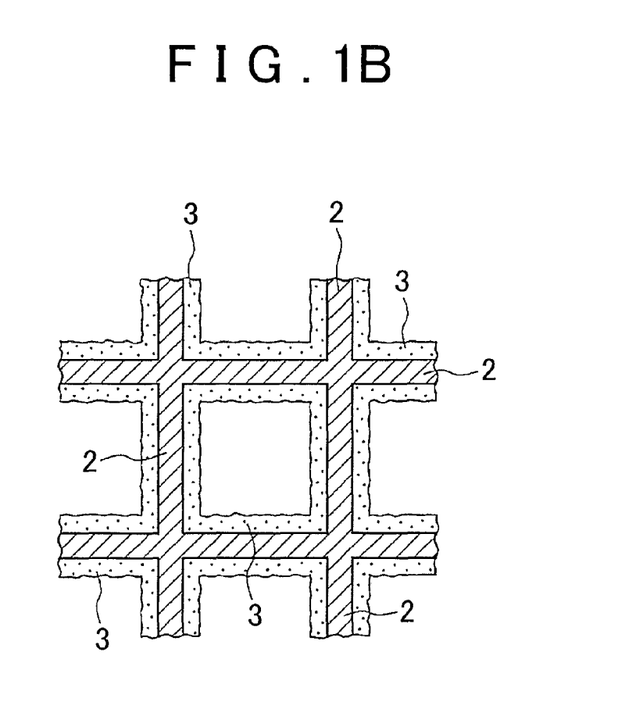
FIG. 1B is an enlarged view of some of cells in the catalytic converter according to the embodiment of the invention.
Figure 2A:
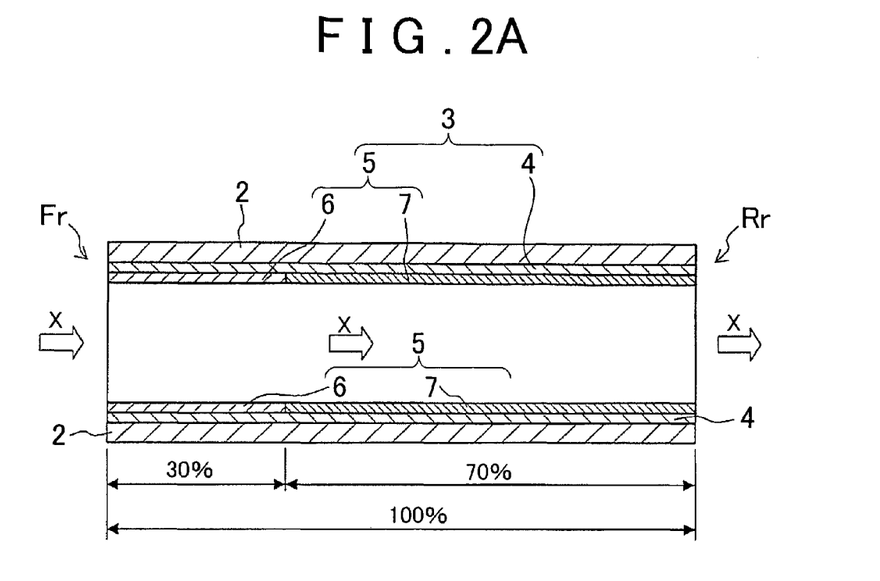
FIGS. 2A and B are longitudinal sectional views showing catalyst layers in the embodiment of the invention.
Figure 2B:
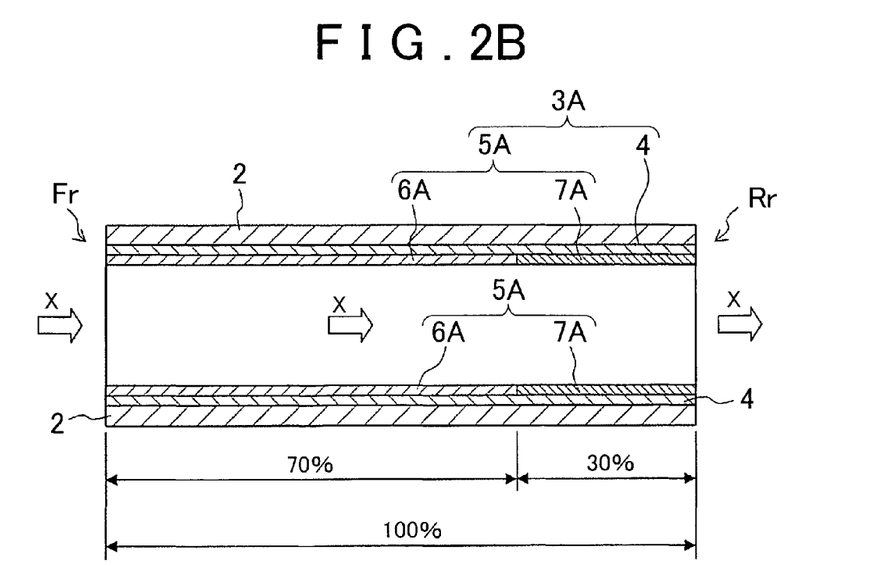

Embodiments of the catalytic converter of the invention are described below in conjunction with the diagrams.
(Exhaust System)
First, a system for emitting exhaust gases having located therein a catalytic converter according to an embodiment of the invention is described. In the exhaust system where the catalytic converter according to an embodiment of the invention is employed, an engine, a catalytic converter, a three-way catalytic converter, a submuffler and a main muffler are arranged and connected to each other by system pipes. Exhaust gases produced by the engine flow through each part and are emitted by way of the system pipes. An embodiment of the catalytic converter is described below.
(Embodiment of Catalytic Converter)
FIG. 1A is a schematic view of a catalytic converter according to an embodiment of the invention, and FIG. 1B is an enlarged view of some of the cells in the catalytic converter. FIGS. 2A and 2B are longitudinal sectional views showing embodiments of the catalyst layer in the catalytic converter.

The catalytic converter 10 shown in FIGS. 1A and 1B is formed of a tubular substrate 1 having numerous cells and a catalyst layer 3 formed on the surfaces of cell walls 2 making up the cells. The cell structure may be regarded as being constituted by the numerous cells.

Here, the material making up the substrate 1 is exemplified by ceramic materials such as cordierite (made of a composite oxide of magnesium oxide, aluminum oxide and silicon dioxide) and silicon carbide, and materials other than ceramic materials, such as metallic materials.

The substrate 1 has a honeycomb structure constituted by numerous lattices, e.g., tetragonal, hexagonal or octagonal cells. Exhaust gases that have flowed into the cells on, in the direction of exhaust gas flow, the upstream side (Fr side) end of the substrate 1 pass through the interior of the substrate 1 and are purified in the course of such passage. The purified exhaust gases flow out (X direction) from the substrate 1 on, in the direction of exhaust gas flow, the downstream side (Rr side) end thereof.

Next, an embodiment of the catalyst layer is described while referring to FIGS. 2A and 2B.

The catalyst layer 3 shown in FIG. 2A is constituted by a bottom catalyst layer 4 formed on the surface of the substrate 1 and a top catalyst layer 5 formed on the surface of the bottom catalyst layer 4. The top catalyst layer 5 is additionally constituted by a first top catalyst layer 6 on the upstream side of the substrate 1 in the direction of exhaust gas flow and a second top catalyst layer 7 on the downstream side of the substrate 1 in the direction of exhaust gas flow. The top catalyst layer 5 is a zone-coated catalyst layer.

The bottom catalyst layer 4 has a length that extends the entire length of the substrate 1, and is formed by supporting the noble metal catalyst Pd on an oxide support.

In this embodiment, oxides composed of any one from among ceria ($CeO_2$), zirconia ($ZrO_2$) and alumina ($Al_2O_3$), composite oxides composed of two or more of these, and so on may be used as the oxide support forming the bottom catalyst layer 4. The composite oxides are, for example, $CeO_2$—$ZrO_2$ compounds (available as "CZ materials") and $Al_2O_3$—$CeO_2$—$ZrO_2$ tertiary composite oxides (available as "ACZ materials"). Incidentally, $Al_2O_3$ is introduced into $Al_2O_3$—$CeO_2$—$ZrO_2$ tertiary composite oxides as a diffusion barrier.

The first top catalyst layer 6 in the top catalyst layer 5 of the embodiment shown in FIG. 2A has a length that is 30% of the entire length of the substrate 1, and is formed by supporting the noble metal catalyst Rh on an oxide support. The second top catalyst layer 7 has a length that is 70%, of the entire length of the substrate 1, and is formed by supporting the noble metal catalyst Rh on the oxide support.

In this embodiment, $CeO_2$—$ZrO_2$ compounds (available as "CZ materials") which are zirconia complex oxides that include at least ceria ($CeO_2$), $Al_2O_3$—$CeO_2$—$ZrO_2$ tertiary composite oxides (available as "ACZ materials"), and so on may be used as the oxide support forming the second top catalyst layer 7. Incidentally, $Al_2O_3$ is introduced into the $Al_2O_3$—$CeO_2$—$ZrO_2$ tertiary composite oxides as a diffusion barrier.

On the other hand, $Al_2O_3$—$ZrO_2$ binary complex oxides (AZ materials), for example, may be used as the oxide support forming the first top catalyst layer 6. As described above, the $Al_2O_3$—$ZrO_2$ binary complex oxides are zirconia composite oxides that do not contain ceria.

There exists a tradeoff between the fact that a high OSC is achieved by supporting Rh on a ceria-containing support and the fact that increasing the amount of ceria in the support lowers the NOx conversion performance that is characteristic of Rh. This dilemma can be addressed by employing, as shown in the illustrated embodiment, a zone-coated configuration having a ceria-containing catalyst layer and a ceria-free catalyst layer, and thereby forming catalyst layers in which the OSC and the NOx conversion performance are both good.

In addition, the ratio SD1/SD2 of the density of supported Rh SD1 in the first top catalyst layer 6 to the density of supported Rh SD2 in the second top catalyst layer 7 is adjusted to at least 1 and at most 3.

As is apparent also from the subsequently described experimental results, the inventors have empirically found that a catalyst having both a good NOx conversion performance under high engine load and a good catalyst warm-up performance can be obtained by adjusting the ratio SD1/SD2 to at least 1 and at most 3.

Meanwhile, in the top catalyst layer 5A of the catalyst layer 3A shown in FIG. 2B, the first top catalyst layer 6A and the second top catalyst layer 7A have lengths which are respectively 70% and 30% of the entire length of the substrate 1, and these lengths are the reverse of the lengths of the layers in the embodiment shown in FIG. 2A.

As subsequently described, the inventors have empirically found that when the length of the first top catalyst layer is in the range of 30 to 70 (and conversely, when the length of the second top catalyst layer is in the range of 70 to 30%) of the entire length of the substrate 1, a catalyst layer having both a good OSC and a good NOx conversion performance can be obtained.

Experiments and the results of those experiments are described as below. One of the experiments is an experiment to determine the relationship between the ratio SD1/SD2 of the density of supported Rh SD1 in the first top catalyst layer to the density of supported Rh SD2 in the second top catalyst layer and the NOx conversion efficiency under high loading. The other of the experiments is an experiment to determine the relationship between the ratio SD1/SD2 and the HC 50% conversion time. The inventors produced catalyst slurries and catalytic converters by the following method, conducted durability tests and engine bench tests, and carried out performance evaluations of the catalytic converters. The relationship between the ratio SD1/SD2 of the density of supported Rh SD 1 in the first top catalyst layer to the density of supported Rh SD2 in the second top catalyst layer and the NOx conversion efficiency under high loading was then determined, and the relationship between the ratio SD1/SD2 and the HC 50% conversion time was also determined. The optimal range in SD1/SD2 was identified from these results. The 12 types of catalyst layers in Examples 1 to 5 and Comparative Examples 1 to 7 shown in Table 1 below were produced, catalytic converters equipped with these respective catalyst layers were produced, and durability tests were carried out.

The methods used to prepare the catalyst slurries were as follows. A slurry to form the bottom catalyst layer (Pd catalyst layer) was prepared by first impregnating a support 65 g/L of $Al_2O_3$ composite oxide with a Pd nitrate solution so as to produce a 1.0 wt % supporting powder. Then, a Pd catalyst slurry was prepared by adding a $CeO_2$—$ZrO_2$ composite oxide ($CeO_2$/$ZrO_2$/$La_2O_3$/$Y_2O_3$=30/60/5/5 (wt %)) in an amount corresponding to 85 g/L, Ba acetate in an amount corresponding to 10 g/L, water, $Al_2O_3$ binder, acetic acid, a thickener and the like to the supporting powder in given amounts and mixing the mixture.

In a separate procedure, a slurry to form the top catalyst layer (Rh catalyst layer) was produced by compounding a $CeO_2$—$ZrO_2$ composite oxide ($Al_2O_3$/$CeO_2$/$ZrO_2$/$La_2O_3$/$Y_2O_3$/$Nd_2O_3$=30/20/44/2/2/2 (wt %)) or a $ZrO_2$ composite oxide ($Al_2O_3$/$ZrO_2$/$La_2O_3$/$Nd_2O_3$=50/46/2/2 (wt %)) to a concentration of 65 g/L, then supporting Rh in the amounts shown in Table 1 below onto the respective supports (the amount of Rh in the catalysts was made uniform). In addition, La-doped $Al_2O_3$ in an amount equivalent to 25 g/L, Ba acetate in an amount equivalent to 10 g/L, water, $Al_2O_3$ binder, acetic acid, a thickener and the like were added thereto in given amounts and mixed, thereby giving the Rh catalyst slurries. As for the catalytic layer in Comparative Example 3, a $CeO_2$—$ZrO_2$ composite oxide and a $ZrO_2$ composite oxide were blended together in a 1:1 ratio, and the total amount was made uniform.

A monolithic substrate (875 cc) was furnished, and was coated by a suction process with the slurries prepared as described above (with the Pd catalyst layer being applied over 100% of the substrate length, and the respective Rh catalyst layers being applied as indicated in Table 1 below). In Table 1 below, AZLNY stands for $Al_2O_3$/$ZrO_2$/$La_2O_3$/$Y_2O_3$/$Nd_2O_3$, and AZLCNY stands for $Al_2O_3$/$CeO_2$/$ZrO_2$/$La_2O_3$/$Y_2O_3$/$Nd_2O_3$.

TABLE 1

| | Length of top catalyst layer (Fr/Rr) (%) | First top catalyst layer support | Second top catalyst layer support | Amount of $CeO_2$ in top catalyst layer (g) | Density of supported Rh SD1 in first top catalyst layer (g/L) | Density of supported Rh SD2 in second top catalyst layer (g/L) |
|---|---|---|---|---|---|---|
| Comp. Ex. 1 | 100/0 | AZLCNY | | 11.4 | 0.20 | |
| Comp. Ex. 2 | 100/0 | AZLNY | | 0 | 0.20 | |
| Comp. Ex. 3 | 100/0 | AZLNY + AZLCNY | | 5.7 | 0.20 | |
| Example 1 | 50/50 | AZLNY | AZLCNY | 5.7 | 0.20 | 0.20 |
| Comp. Ex. 4 | 50/50 | AZLNY | AZLCNY | 5.7 | 0 | 0.40 |
| Comp. Ex. 5 | 50/50 | AZLNY | AZLCNY | 5.7 | 0.10 | 0.30 |
| Comp. Ex. 6 | 50/50 | AZLNY | AZLCNY | 5.7 | 0.15 | 0.25 |
| Example 2 | 50/50 | AZLNY | AZLCNY | 5.7 | 0.25 | 0.15 |
| Example 3 | 50/50 | AZLNY | AZLCNY | 5.7 | 0.30 | 0.10 |
| Comp. Ex. 7 | 50/50 | AZLNY | AZLCNY | 5.7 | 0.40 | 0 |
| Example 4 | 30/70 | AZLNY | AZLCNY | 5.7 | 0.20 | 0.20 |

TABLE 1-continued

|  | Length of top catalyst layer (Fr/Rr) (%) | First top catalyst layer support | Second top catalyst layer support | Amount of CeO$_2$ in top catalyst layer (g) | Density of supported Rh SD1 in first top catalyst layer (g/L) | Density of supported Rh SD2 in second top catalyst layer (g/L) |
|---|---|---|---|---|---|---|
| Example 5 | 70/30 | AZLNY | AZLCNY | 5.7 | 0.20 | 0.20 |

The catalytic converters produced were set directly below a working engine, and a 50-hour durability test was conducted at a bed temperature of 1,000° C. under a complex pattern where the air-fuel ratio is cyclically changed.

Figure 3:
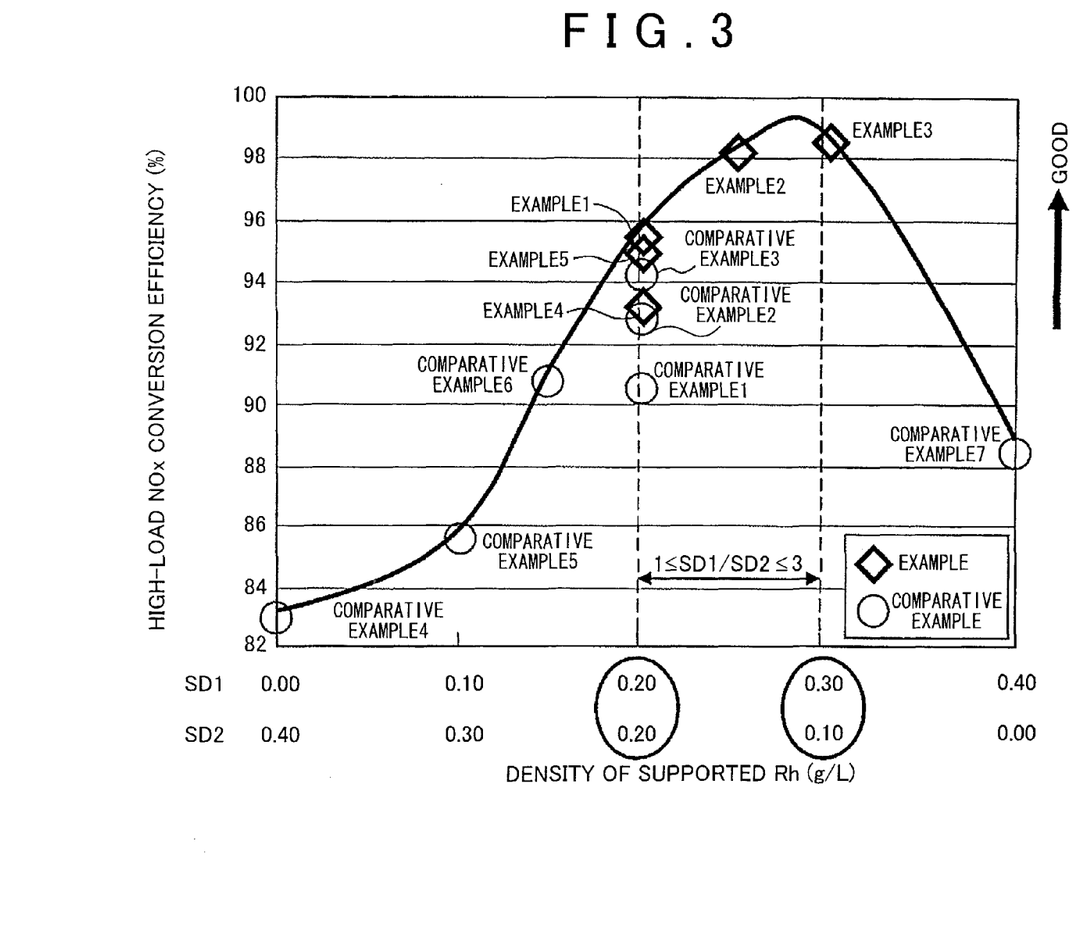
FIG. 3 is a graph showing experimental results which determine a relationship between a ratio SD1/SD2 and NOx conversion efficiency under a high load, the ratio SD1/SD2 corresponding to a ratio of the density of supported Rh SD1 in the first top catalyst layer to the density of supported Rh SD2 in the second top catalyst layer.

Engine bench testing is described below. The catalytic converter subjected to a durability test was then set in another working engine, and the time from stoichiometric engine startup until the concentration of HCs falls to 50% or below was measured to determine the catalyst warm-up performance. Also, the NOx conversion efficiency when running the engine under operating conditions corresponding to a vehicle speed of 160 km/h was measured to determine the NOx conversion performance under a high engine load. The test results are shown in Table 2 below and in FIGS. 3 and 4.

TABLE 2

|  | NOx conversion efficiency under high engine load (%) | Time to 50% conversion of HCs (seconds) |
|---|---|---|
| Comparative Example 1 | 90.5 | 16.3 |
| Comparative Example 2 | 92.8 | 15.5 |
| Comparative Example 3 | 94.3 | 15.8 |
| Example 1 | 95.5 | 15.4 |
| Comparative Example 4 | 83.0 | 18.8 |
| Comparative Example 5 | 85.6 | 17.5 |
| Comparative Example 6 | 90.8 | 16.2 |
| Example 2 | 98.2 | 15.2 |
| Example 3 | 98.5 | 14.4 |
| Comparative Example 7 | 88.5 | 13.2 |
| Example 4 | 93.8 | 15.5 |
| Example 5 | 95.2 | 15.4 |

As shown in Table 1, in Examples 1 to 5, the support used on the upstream side and the support used on the downstream side were of different types. Moreover, in Examples 2 and 3, the density of supported Rh was made higher in the top catalyst layer on the upstream side than in the top catalyst layer on the downstream side. It is apparent from Table 2 and FIG. 3 that, compared with Comparative Examples 1 to 7, the catalytic converters in Examples 1 to 5 resulted in higher NOx conversion efficiencies under high engine loading. It is also apparent that, in the absence of Rh in the top catalyst layer on the downstream side (Comparative Example 7), the conversion performance abruptly decreases. It was also demonstrated from this experiment that it is desirable: to form the upstream-side top catalyst layer that starts from the upstream side end of the substrate and has a length that is 30 to 70% (X %) of the entire length of the substrate; to form the downstream-side top catalyst layer that starts from the downstream side end of the substrate and has a length that is 100-X % of the entire length of the substrate; and to set the ratio SD1/SD2 of the density of supported Rh SD1 on the upstream side top catalyst layer to the density of supported Rh SD2 on the downstream side top catalyst layer in the range of at least 1 and at most 3. It was additionally found that, with regard to the NOx conversion efficiency, an SD1/SD2 ratio of at least 5/3 and at most 3 is more preferred.

Figure 4:
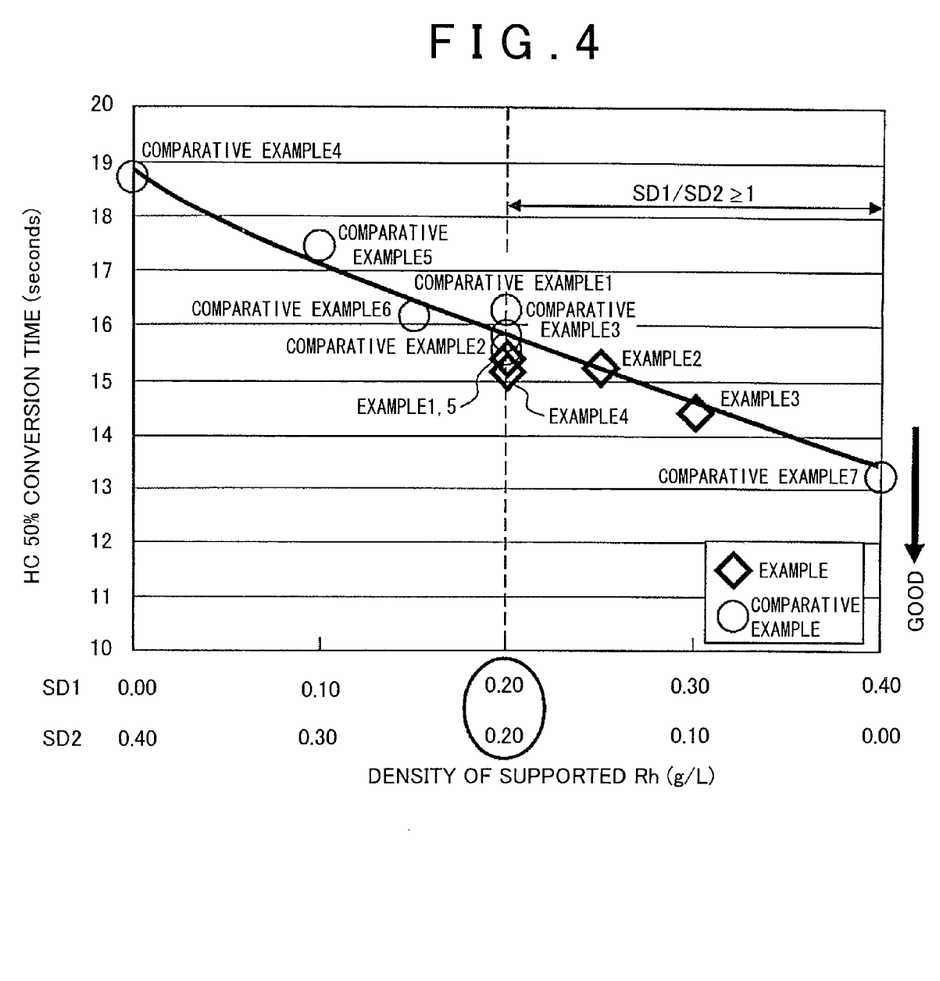
FIG. 4 is a graph showing experimental results which determine a relation between the ratio SD1/SD2 and the HC 50% conversion time.

From Table 2 and FIG. 4, it was found that, compared with Comparative Examples 1 to 7, the catalytic converters in Examples 1 to 5 resulted in an improved catalyst warm-up performance. Moreover, an SD1/SD2 ratio of at least 5/3 and at most 3 is also preferred with regard to the catalyst warm-up performance. From the results in each of the above examples, it was demonstrated that the SD1/SD2 ratio is preferably 1 or more. This is consistent with the results for NOx conversion performance under high engine load.

From the above two sets of experimental results, it was found that by setting the SD1/SD2 ratio in the range of at least 1 and at most 3, a catalytic converter having an excellent OSC, an excellent NOx conversion performance under high engine load, and an excellent catalyst warm-up performance can be provided.

The embodiment of the invention has been described above in detail with reference made to the drawings. However, the specific structure of the invention is not limited to the embodiment, and design modifications not departing from the gist of the invention are also included in the scope of the invention.

What is claimed is:

1. A catalytic converter comprising:
   a substrate including a cell structure configured to allow exhaust gas to flow through the cell structure; and
   a catalyst layer formed on a surface of a cell wall of the substrate,
   wherein
   the catalyst layer includes a bottom catalyst layer, a first top catalyst layer and a second top catalyst layer,
   the bottom catalyst layer is provided on a surface of the substrate over an entire length of the substrate,
   the first top catalyst layer is provided on a surface of the bottom catalyst layer on an upstream side of the substrate in an exhaust gas flow direction,
   the second top catalyst layer is provided on a surface of the bottom catalyst layer on a downstream side of the substrate in the exhaust gas flow direction,
   the bottom catalyst layer is made of a support and palladium supported on the support,
   the first top catalyst layer is made of a ceria-free zirconia composite oxide support and rhodium supported on the ceria-free zirconia composite oxide support, and is a ceria-free catalyst layer,
   the second top catalyst layer is made of a ceria-containing zirconia composite oxide support and rhodium supported on the ceria-containing zirconia composite oxide support,
   the first top catalyst layer starts from an upstream side end of the substrate and has a length that is X % of the entire length of the substrate in the exhaust gas flow direction, X being from 30% to 70%,
   the second top catalyst layer starts from a downstream side end of the substrate and has a length that is 100-X % of the entire length of the substrate in the exhaust gas flow direction, and
   a ratio of a support density of rhodium supported in the first top catalyst layer to a support density of rhodium supported in the second top catalyst layer is at least 1 and at most 3, wherein the support density is the amount of rhodium per unit volume of the support.

2. The catalytic converter of claim 1, wherein the ratio of the support density of rhodium supported in the first top catalyst layer to the support density of rhodium supported in the second top catalyst layer is at least 5/3 and at most 3.

3. The catalytic converter of claim 1, wherein the ceria-free zirconia composite oxide is $Al_2O_3$—$ZrO_2$ composite oxide.

4. The catalytic converter of claim 1, wherein the ceria-containing zirconia composite oxide is $CeO_3$—$ZrO_2$ composite oxide or $Al_2O_3$—$CeO_2$—$ZrO_2$ composite oxide.

5. The catalytic converter of claim 3, wherein the $Al_2O_3$—$ZrO_2$ composite oxide includes $LaO_3$, $Y_2O_3$ and $Nd_2O_3$.

6. The catalytic converter of claim 4, wherein the $CeO_3$—$ZrO_2$ composite oxide or $Al_2O_3$—$CeO_2$—$ZrO_2$ composite oxide includes $LaO_3$, $Y_2O_3$ and $Nd_2O_3$.

7. The catalytic converter of claim 1, wherein
the first top catalyst layer consists of a ceria-free zirconia composite oxide support and rhodium supported on the ceria-free zirconia composite oxide support, and
the second top catalyst layer consists of a ceria-containing zirconia composite oxide support and rhodium supported on the ceria-containing zirconia composite oxide support.

* * * * *